US009558186B2

(12) United States Patent
Betz et al.

(10) Patent No.: US 9,558,186 B2
(45) Date of Patent: Jan. 31, 2017

(54) UNSUPERVISED EXTRACTION OF FACTS

(71) Applicant: GOOGLE INC., Mountain View, CA (US)

(72) Inventors: Jonathan T. Betz, Summit, NJ (US); Shubin Zhao, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 160 days.

(21) Appl. No.: 14/460,117

(22) Filed: Aug. 14, 2014

(65) Prior Publication Data

US 2014/0372473 A1 Dec. 18, 2014

Related U.S. Application Data

(63) Continuation of application No. 11/394,414, filed on Mar. 31, 2006, now Pat. No. 8,825,471, which is a continuation-in-part of application No. 11/142,853, filed on May 31, 2005, now Pat. No. 7,769,579.

(51) Int. Cl.
*G06F 17/27* (2006.01)
*G06F 17/30* (2006.01)

(52) U.S. Cl.
CPC ... *G06F 17/30011* (2013.01); *G06F 17/30707* (2013.01); *G06F 17/30864* (2013.01); *G06F 17/30914* (2013.01); *Y10S 707/962* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2795
USPC ................................. 704/1, 9, 10
See application file for complete search history.

(56) References Cited

U.S. PATENT DOCUMENTS

| 5,010,478 | A | 4/1991 | Deran |
| 5,133,075 | A | 7/1992 | Risch |
| 5,347,653 | A | 9/1994 | Flynn et al. |
| 5,440,730 | A | 8/1995 | Elmasri et al. |
| 5,475,819 | A | 12/1995 | Miller et al. |

(Continued)

FOREIGN PATENT DOCUMENTS

| JP | 5-174020 A | 7/1993 |
| JP | 11-265400 A | 9/1999 |

(Continued)

OTHER PUBLICATIONS

Etzioni et al., Web-Scale Information Extraction in KnowItAll, 2004, ACM, Proceedings of the 13th international conference on World Wide Web, pp.={100-110}.*

(Continued)

*Primary Examiner* — Lamont Spooner
(74) *Attorney, Agent, or Firm* — Brake Hughes Bellermann LLP

(57) ABSTRACT

A system and method for extracting facts from documents. A fact is extracted from a first document. The attribute and value of the fact extracted from the first document are used as a seed attribute-value pair. A second document containing the seed attribute-value pair is analyzed to determine a contextual pattern used in the second document. The contextual pattern is used to extract other attribute-value pairs from the second document. The extracted attributes and values are stored as facts.

20 Claims, 11 Drawing Sheets

(56) References Cited

U.S. PATENT DOCUMENTS

| | | |
|---|---|---|
| 5,519,608 A | 5/1996 | Kupiec |
| 5,546,507 A | 8/1996 | Staub |
| 5,560,005 A | 9/1996 | Hoover et al. |
| 5,574,898 A | 11/1996 | Leblang et al. |
| 5,675,785 A | 10/1997 | Hall et al. |
| 5,680,622 A | 10/1997 | Even |
| 5,694,590 A | 12/1997 | Thuraisingham et al. |
| 5,701,470 A | 12/1997 | Joy et al. |
| 5,717,911 A | 2/1998 | Madrid et al. |
| 5,717,951 A | 2/1998 | Yabumoto |
| 5,724,571 A | 3/1998 | Woods |
| 5,778,373 A | 7/1998 | Levy et al. |
| 5,778,378 A | 7/1998 | Rubin |
| 5,787,413 A | 7/1998 | Kauffman et al. |
| 5,793,966 A | 8/1998 | Amstein |
| 5,802,299 A | 9/1998 | Logan et al. |
| 5,815,415 A | 9/1998 | Bentley et al. |
| 5,819,210 A | 10/1998 | Maxwell, III et al. |
| 5,819,265 A | 10/1998 | Ravin et al. |
| 5,822,743 A | 10/1998 | Gupta et al. |
| 5,826,258 A | 10/1998 | Gupta et al. |
| 5,838,979 A | 11/1998 | Hart et al. |
| 5,882,743 A | 3/1999 | McConnell |
| 5,909,689 A | 6/1999 | Van Ryzin |
| 5,920,859 A | 7/1999 | Li |
| 5,943,670 A | 8/1999 | Prager |
| 5,956,718 A | 9/1999 | Prasad et al. |
| 5,974,254 A | 10/1999 | Hsu |
| 5,987,460 A | 11/1999 | Niwa et al. |
| 6,006,221 A | 12/1999 | Liddy et al. |
| 6,018,741 A | 1/2000 | Howland et al. |
| 6,038,560 A | 3/2000 | Wical |
| 6,044,366 A | 3/2000 | Graffe et al. |
| 6,052,693 A | 4/2000 | Smith et al. |
| 6,064,952 A | 5/2000 | Imanaka et al. |
| 6,073,130 A | 6/2000 | Jacobson et al. |
| 6,078,918 A | 6/2000 | Allen et al. |
| 6,112,203 A | 8/2000 | Bharat et al. |
| 6,112,210 A | 8/2000 | Nori et al. |
| 6,122,647 A | 9/2000 | Horowitz et al. |
| 6,134,555 A | 10/2000 | Chadha et al. |
| 6,138,270 A | 10/2000 | Hsu |
| 6,182,063 B1 | 1/2001 | Woods |
| 6,202,065 B1 | 3/2001 | Wills |
| 6,212,526 B1 | 4/2001 | Chaudhuri et al. |
| 6,240,546 B1 | 5/2001 | Lee et al. |
| 6,263,328 B1 | 7/2001 | Coden et al. |
| 6,263,358 B1 | 7/2001 | Lee et al. |
| 6,266,805 B1 | 7/2001 | Nwana et al. |
| 6,285,999 B1 | 9/2001 | Page |
| 6,289,338 B1 | 9/2001 | Stoffel et al. |
| 6,311,194 B1 | 10/2001 | Sheth et al. |
| 6,314,555 B1 | 11/2001 | Ndumu et al. |
| 6,327,574 B1 | 12/2001 | Kramer et al. |
| 6,349,275 B1 | 2/2002 | Schumacher et al. |
| 6,377,943 B1 | 4/2002 | Jakobsson |
| 6,397,228 B1 | 5/2002 | Lamburt et al. |
| 6,438,543 B1 | 8/2002 | Kazi et al. |
| 6,470,330 B1 | 10/2002 | Das et al. |
| 6,473,898 B1 | 10/2002 | Waugh et al. |
| 6,487,495 B1 | 11/2002 | Gale et al. |
| 6,502,102 B1 | 12/2002 | Haswell et al. |
| 6,519,631 B1 | 2/2003 | Rosenschein et al. |
| 6,556,991 B1 | 4/2003 | Borkovsky |
| 6,565,610 B1 | 5/2003 | Wang et al. |
| 6,567,846 B1 | 5/2003 | Garg et al. |
| 6,567,936 B1 | 5/2003 | Yang et al. |
| 6,572,661 B1 | 6/2003 | Stern |
| 6,578,032 B1 | 6/2003 | Chandrasekar et al. |
| 6,584,464 B1 | 6/2003 | Warthen |
| 6,584,646 B2 | 7/2003 | Fujita |
| 6,594,658 B2 | 7/2003 | Woods |
| 6,606,625 B1 | 8/2003 | Muslea et al. |
| 6,606,659 B1 | 8/2003 | Hegli et al. |
| 6,609,123 B1 | 8/2003 | Cazemier et al. |
| 6,636,742 B1 | 10/2003 | Torkki et al. |
| 6,643,641 B1 | 11/2003 | Snyder |
| 6,665,659 B1 | 12/2003 | Logan |
| 6,665,666 B1 | 12/2003 | Brown et al. |
| 6,665,837 B1 | 12/2003 | Dean et al. |
| 6,675,159 B1 | 1/2004 | Lin et al. |
| 6,684,205 B1 | 1/2004 | Modha et al. |
| 6,693,651 B2 | 2/2004 | Biebesheimer et al. |
| 6,704,726 B1 | 3/2004 | Amouroux |
| 6,738,767 B1 | 5/2004 | Chung et al. |
| 6,745,189 B2 | 6/2004 | Schreiber |
| 6,754,873 B1 | 6/2004 | Law et al. |
| 6,763,496 B1 | 7/2004 | Hennings et al. |
| 6,799,176 B1 | 9/2004 | Page |
| 6,804,667 B1 | 10/2004 | Martin |
| 6,820,081 B1 | 11/2004 | Kawai et al. |
| 6,820,093 B2 | 11/2004 | de la Huerga |
| 6,823,495 B1 | 11/2004 | Vedula et al. |
| 6,832,218 B1 | 12/2004 | Emens et al. |
| 6,845,354 B1 | 1/2005 | Kuo et al. |
| 6,850,896 B1 | 2/2005 | Kelman et al. |
| 6,868,411 B2 | 3/2005 | Shanahan |
| 6,873,982 B1 | 3/2005 | Bates et al. |
| 6,873,993 B2 | 3/2005 | Charlesworth et al. |
| 6,886,005 B2 | 4/2005 | Davis |
| 6,886,010 B2 | 4/2005 | Kostoff |
| 6,901,403 B1 | 5/2005 | Bata et al. |
| 6,904,429 B2 | 6/2005 | Sako et al. |
| 6,957,213 B1 | 10/2005 | Yuret |
| 6,963,880 B1 | 11/2005 | Pingte |
| 6,965,900 B2 | 11/2005 | Srinivasa |
| 6,996,572 B1 | 2/2006 | Chakrabarti et al. |
| 7,003,506 B1 | 2/2006 | Fisk |
| 7,003,522 B1 | 2/2006 | Reynar et al. |
| 7,003,719 B1 | 2/2006 | Rosenoff et al. |
| 7,007,228 B1 | 2/2006 | Carro |
| 7,013,308 B1 | 3/2006 | Tunstall-Pedoe |
| 7,020,662 B2 | 3/2006 | Boreham et al. |
| 7,043,521 B2 | 5/2006 | Eitel |
| 7,051,023 B2 | 5/2006 | Kapur et al. |
| 7,076,491 B2 | 7/2006 | Tsao |
| 7,080,073 B1 | 7/2006 | Jiang et al. |
| 7,080,085 B1 | 7/2006 | Choy et al. |
| 7,100,082 B2 | 8/2006 | Little et al. |
| 7,143,099 B2 | 11/2006 | Lecheler-Moore et al. |
| 7,146,536 B2 | 12/2006 | Bingham et al. |
| 7,158,980 B2 | 1/2007 | Shen |
| 7,162,499 B2 | 1/2007 | Lees et al. |
| 7,165,024 B2 | 1/2007 | Glover et al. |
| 7,174,504 B2 | 2/2007 | Tsao |
| 7,181,471 B1 | 2/2007 | Ibuki et al. |
| 7,194,380 B2 | 3/2007 | Barrow et al. |
| 7,197,449 B2 | 3/2007 | Hu et al. |
| 7,216,073 B2 | 5/2007 | Lavi et al. |
| 7,233,943 B2 | 6/2007 | Modha et al. |
| 7,263,565 B2 | 8/2007 | Tawara et al. |
| 7,269,587 B1 | 9/2007 | Page et al. |
| 7,277,879 B2 | 10/2007 | Varadarajan |
| 7,302,646 B2 | 11/2007 | Nomiyama et al. |
| 7,305,380 B1 | 12/2007 | Hoelzle et al. |
| 7,325,160 B2 | 1/2008 | Tsao |
| 7,363,312 B2 | 4/2008 | Goldsack |
| 7,376,895 B2 | 5/2008 | Tsao |
| 7,409,381 B1 | 8/2008 | Steel et al. |
| 7,412,078 B2 | 8/2008 | Kim |
| 7,418,736 B2 | 8/2008 | Ghanea-Hercock |
| 7,454,430 B1 | 11/2008 | Komissarchik et al. |
| 7,472,182 B1 | 12/2008 | Young et al. |
| 7,483,829 B2 | 1/2009 | Murakami et al. |
| 7,493,308 B1 | 2/2009 | Bair et al. |
| 7,493,317 B2 | 2/2009 | Geva |
| 7,587,387 B2 | 9/2009 | Hogue |
| 7,644,076 B1 | 1/2010 | Ramesh et al. |
| 7,672,971 B2 | 3/2010 | Betz et al. |
| 7,685,201 B2 | 3/2010 | Zeng et al. |
| 7,698,303 B2 | 4/2010 | Goodwin et al. |
| 7,716,225 B1 | 5/2010 | Dean et al. |
| 7,747,571 B2 | 6/2010 | Boggs |
| 7,756,823 B2 | 7/2010 | Young et al. |

(56) References Cited

U.S. PATENT DOCUMENTS

| | | |
|---|---|---|
| 7,797,282 B1 | 9/2010 | Kirshenbaum et al. |
| 7,885,918 B2 | 2/2011 | Statchuk |
| 7,917,154 B2 | 3/2011 | Fortescue et al. |
| 7,953,720 B1 | 5/2011 | Rohde et al. |
| 8,024,281 B2 | 9/2011 | Proctor et al. |
| 8,065,290 B2 | 11/2011 | Hogue |
| 8,086,690 B1 | 12/2011 | Heymans et al. |
| 8,108,501 B2 | 1/2012 | Birnie et al. |
| 8,122,026 B1 | 2/2012 | Laroco et al. |
| 8,347,202 B1 | 1/2013 | Vespe et al. |
| 8,650,175 B2 | 2/2014 | Hogue et al. |
| 8,751,498 B2 | 6/2014 | Yakovenko et al. |
| 8,812,435 B1 | 8/2014 | Zhao |
| 8,825,471 B2 | 9/2014 | Zhao et al. |
| 9,092,495 B2 | 7/2015 | Hogue et al. |
| 9,208,229 B2 | 12/2015 | Betz et al. |
| 2001/0021935 A1 | 9/2001 | Mills |
| 2002/0022956 A1 | 2/2002 | Ukrainczyk et al. |
| 2002/0038307 A1 | 3/2002 | Obradovic et al. |
| 2002/0042707 A1 | 4/2002 | Zhao et al. |
| 2002/0065845 A1 | 5/2002 | Naito et al. |
| 2002/0073115 A1 | 6/2002 | Davis |
| 2002/0083039 A1 | 6/2002 | Ferrari et al. |
| 2002/0087567 A1 | 7/2002 | Spiegler et al. |
| 2002/0107861 A1 | 8/2002 | Clendinning et al. |
| 2002/0147738 A1 | 10/2002 | Reader |
| 2002/0169770 A1 | 11/2002 | Kim et al. |
| 2002/0174099 A1 | 11/2002 | Raj et al. |
| 2002/0178448 A1 | 11/2002 | Te Kiefte et al. |
| 2002/0194172 A1 | 12/2002 | Schreiber |
| 2003/0018652 A1 | 1/2003 | Heckerman et al. |
| 2003/0058706 A1 | 3/2003 | Okamoto et al. |
| 2003/0069880 A1 | 4/2003 | Harrison et al. |
| 2003/0078902 A1 | 4/2003 | Leong et al. |
| 2003/0088607 A1 | 5/2003 | Ruellan et al. |
| 2003/0097357 A1 | 5/2003 | Ferrari et al. |
| 2003/0120644 A1 | 6/2003 | Shirota |
| 2003/0120675 A1 | 6/2003 | Stauber et al. |
| 2003/0126102 A1 | 7/2003 | Borthwick |
| 2003/0126152 A1 | 7/2003 | Rajak |
| 2003/0149567 A1 | 8/2003 | Schmitz et al. |
| 2003/0149699 A1 | 8/2003 | Tsao |
| 2003/0154071 A1 | 8/2003 | Shreve |
| 2003/0177110 A1 | 9/2003 | Okamoto et al. |
| 2003/0182310 A1 | 9/2003 | Charnock et al. |
| 2003/0195872 A1 | 10/2003 | Senn |
| 2003/0195877 A1 | 10/2003 | Ford et al. |
| 2003/0196052 A1 | 10/2003 | Bolik et al. |
| 2003/0204481 A1 | 10/2003 | Lau |
| 2003/0208354 A1 | 11/2003 | Lin et al. |
| 2004/0003067 A1 | 1/2004 | Ferrin |
| 2004/0006576 A1 | 1/2004 | Colbath et al. |
| 2004/0015481 A1 | 1/2004 | Zinda |
| 2004/0024739 A1 | 2/2004 | Copperman et al. |
| 2004/0059726 A1 | 3/2004 | Hunter et al. |
| 2004/0064447 A1 | 4/2004 | Simske et al. |
| 2004/0088292 A1 | 5/2004 | Dettinger et al. |
| 2004/0107125 A1 | 6/2004 | Guheen et al. |
| 2004/0122844 A1 | 6/2004 | Malloy et al. |
| 2004/0122846 A1 | 6/2004 | Chess et al. |
| 2004/0123240 A1 | 6/2004 | Gerstl et al. |
| 2004/0128624 A1 | 7/2004 | Arellano et al. |
| 2004/0143600 A1 | 7/2004 | Musgrove et al. |
| 2004/0153456 A1 | 8/2004 | Charnock et al. |
| 2004/0167870 A1 | 8/2004 | Wakefield et al. |
| 2004/0167907 A1 | 8/2004 | Wakefield et al. |
| 2004/0167911 A1 | 8/2004 | Wakefield et al. |
| 2004/0177015 A1 | 9/2004 | Galai et al. |
| 2004/0177080 A1 | 9/2004 | Doise et al. |
| 2004/0199923 A1 | 10/2004 | Russek |
| 2004/0243552 A1 | 12/2004 | Titemore et al. |
| 2004/0243614 A1 | 12/2004 | Boone et al. |
| 2004/0255237 A1 | 12/2004 | Tong |
| 2004/0260979 A1 | 12/2004 | Kumai |
| 2004/0267700 A1 | 12/2004 | Dumais et al. |
| 2004/0268237 A1 | 12/2004 | Jones et al. |
| 2005/0055365 A1 | 3/2005 | Ramakrishnan et al. |
| 2005/0076012 A1 | 4/2005 | Manber et al. |
| 2005/0080613 A1 | 4/2005 | Colledge et al. |
| 2005/0086211 A1 | 4/2005 | Mayer |
| 2005/0086222 A1 | 4/2005 | Wang et al. |
| 2005/0086251 A1 | 4/2005 | Hatscher et al. |
| 2005/0097150 A1 | 5/2005 | McKeon et al. |
| 2005/0108630 A1 | 5/2005 | Wasson et al. |
| 2005/0114324 A1 | 5/2005 | Mayer et al. |
| 2005/0125311 A1 | 6/2005 | Chidiac et al. |
| 2005/0138007 A1 | 6/2005 | Amitay et al. |
| 2005/0144241 A1 | 6/2005 | Stata et al. |
| 2005/0149576 A1 | 7/2005 | Marmaros et al. |
| 2005/0149851 A1 | 7/2005 | Mittal |
| 2005/0159851 A1 | 7/2005 | Engstrom et al. |
| 2005/0165781 A1 | 7/2005 | Kraft et al. |
| 2005/0187923 A1 | 8/2005 | Cipollone |
| 2005/0188217 A1 | 8/2005 | Ghanea-Hercock |
| 2005/0240615 A1 | 10/2005 | Barsness et al. |
| 2005/0256825 A1 | 11/2005 | Dettinger et al. |
| 2005/0278314 A1 | 12/2005 | Buchheit et al. |
| 2006/0036504 A1 | 2/2006 | Allocca et al. |
| 2006/0041375 A1 | 2/2006 | Witmer et al. |
| 2006/0041597 A1 | 2/2006 | Conrad et al. |
| 2006/0047691 A1 | 3/2006 | Humphreys et al. |
| 2006/0047838 A1 | 3/2006 | Chauhan |
| 2006/0053171 A1 | 3/2006 | Eldridge et al. |
| 2006/0053175 A1 | 3/2006 | Gardner et al. |
| 2006/0064411 A1 | 3/2006 | Gross et al. |
| 2006/0074824 A1 | 4/2006 | Li |
| 2006/0074910 A1 | 4/2006 | Yun et al. |
| 2006/0085465 A1 | 4/2006 | Nori et al. |
| 2006/0112110 A1 | 5/2006 | Maymir-Ducharme et al. |
| 2006/0123046 A1 | 6/2006 | Doise et al. |
| 2006/0129843 A1 | 6/2006 | Srinivasa et al. |
| 2006/0136585 A1 | 6/2006 | Mayfield et al. |
| 2006/0143227 A1 | 6/2006 | Helm et al. |
| 2006/0143603 A1 | 6/2006 | Kalthoff et al. |
| 2006/0149800 A1 | 7/2006 | Egnor et al. |
| 2006/0152755 A1 | 7/2006 | Curtis et al. |
| 2006/0167991 A1 | 7/2006 | Heikes et al. |
| 2006/0224582 A1 | 10/2006 | Hogue |
| 2006/0238919 A1 | 10/2006 | Bradley et al. |
| 2006/0242180 A1 | 10/2006 | Graf et al. |
| 2006/0248045 A1 | 11/2006 | Toledano et al. |
| 2006/0248456 A1 | 11/2006 | Bender et al. |
| 2006/0253418 A1 | 11/2006 | Charnock et al. |
| 2006/0259462 A1 | 11/2006 | Timmons |
| 2006/0277169 A1 | 12/2006 | Lunt et al. |
| 2006/0288268 A1 | 12/2006 | Srinivasan et al. |
| 2006/0293879 A1 | 12/2006 | Zhao et al. |
| 2007/0005593 A1 | 1/2007 | Self et al. |
| 2007/0005639 A1 | 1/2007 | Gaussier et al. |
| 2007/0016890 A1 | 1/2007 | Brunner et al. |
| 2007/0038610 A1 | 2/2007 | Omoigui |
| 2007/0043708 A1 | 2/2007 | Tunstall-Pedoe |
| 2007/0055656 A1 | 3/2007 | Tunstall-Pedoe |
| 2007/0073768 A1 | 3/2007 | Goradia |
| 2007/0094246 A1 | 4/2007 | Dill et al. |
| 2007/0100814 A1 | 5/2007 | Lee et al. |
| 2007/0106455 A1 | 5/2007 | Fuchs et al. |
| 2007/0130123 A1 | 6/2007 | Majumder |
| 2007/0143282 A1 | 6/2007 | Betz et al. |
| 2007/0143317 A1 | 6/2007 | Hogue et al. |
| 2007/0150800 A1 | 6/2007 | Betz et al. |
| 2007/0198451 A1 | 8/2007 | Kehlenbeck et al. |
| 2007/0198480 A1 | 8/2007 | Hogue et al. |
| 2007/0198481 A1 | 8/2007 | Hogue et al. |
| 2007/0198503 A1 | 8/2007 | Hogue et al. |
| 2007/0198577 A1 | 8/2007 | Betz et al. |
| 2007/0198598 A1 | 8/2007 | Betz et al. |
| 2007/0198600 A1 | 8/2007 | Betz |
| 2007/0203867 A1 | 8/2007 | Hogue et al. |
| 2007/0208773 A1 | 9/2007 | Tsao |
| 2007/0258642 A1 | 11/2007 | Thota et al. |
| 2007/0271268 A1 | 11/2007 | Fontoura et al. |
| 2008/0071739 A1 | 3/2008 | Kumar et al. |
| 2008/0104019 A1 | 5/2008 | Nath |

(56) References Cited

U.S. PATENT DOCUMENTS

| | | |
|---|---|---|
| 2009/0006359 A1 | 1/2009 | Liao |
| 2009/0119255 A1 | 5/2009 | Frank et al. |
| 2013/0191385 A1 | 7/2013 | Vespe et al. |
| 2014/0129538 A1 | 5/2014 | Hogue et al. |
| 2014/0289177 A1 | 9/2014 | Laroco et al. |
| 2014/0372478 A1 | 12/2014 | Zhao |
| 2014/0379743 A1 | 12/2014 | Yakovenko et al. |

FOREIGN PATENT DOCUMENTS

| | | |
|---|---|---|
| JP | 2002-157276 | 5/2002 |
| JP | 2002-540506 A | 11/2002 |
| JP | 2003-281173 A | 10/2003 |
| WO | WO 01/27713 A2 | 4/2001 |
| WO | WO 2004/114163 A2 | 12/2004 |
| WO | WO 2006/104951 A1 | 10/2006 |

OTHER PUBLICATIONS

Agichtein, Snowball estracting relations from large plain-text collections, Dec. 1999, 13 pgs.
Andritsos, Information-theoretic tools for mining database structure from large data sets, Jun. 13-18, 2004, 12 pgs.
Betz, Examiner's Answer, U.S. Appl. No. 11/097,688, Jul. 8, 2010, 18 pgs.
Betz, Examiner's Answer, U.S. Appl. No. 11/394,414, Jan. 24, 2011, 31 pgs.
Betz, Final Office Action, U.S. Appl. No. 11/394,552, Oct. 21, 2013, 22 pgs.
Betz, Notice of Allowance, U.S. Appl. No. 11/097,688, Nov. 19, 2013, 17 pgs.
Betz, Notice of Allowance, U.S. Appl. No. 11/142,740, Apr. 16, 2009, 7 pgs.
Betz, Notice of Allowance, U.S. Appl. No. 11/142,765, Jul. 1, 2010, 14 pgs.
Betz, Notice of Allowance, U.S. Appl. No. 11/341,069, Sep. 8, 2008, 6 pgs.
Betz, Notice of Allowance, U.S. Appl. No. 11/394,414, Apr. 30, 2014, 12 pgs.
Betz, Notice of Allowance, U.S. Appl. No. 12/939,981, Aug. 11, 2011, 7 pgs.
Betz, Notice of Allowance, U.S. Appl. No. 12/939,981, Apr. 26, 2011, 11 pgs.
Betz, Notice of Allowance, U.S. Appl. No. 13/302,755, Jan. 6, 2014, 9 pgs.
Betz, Notice of Allowance, U.S. Appl. No. 13/302,755, Aug. 28, 2013, 6 pgs.
Betz, Office Action, U.S. Appl. No. 11/097,688, Mar. 18, 2009, 13 pgs.
Betz, Office Action, U.S. Appl. No. 11/097,688, Oct. 29, 2009, 11 pgs.
Betz, Office Action, U.S. Appl. No. 11/142,740, Aug. 13, 2007, 12 pgs.
Betz, Office Action, U.S. Appl. No. 11/142,740, May 17, 2007, 12 pgs.
Betz, Office Action, U.S. Appl. No. 11/142,740, Jul. 23, 2008, 11 pgs.
Betz, Office Action, U.S. Appl. No. 11/142,740, Dec. 26, 2007, 12 pgs.
Betz, Office Action, U.S. Appl. No. 11/142,740, Jan. 27, 2009, 11 pgs.
Betz, Office Action, U.S. Appl. No. 11/142,740, Apr. 30, 2008, 14 pgs.
Betz, Office Action, U.S. Appl. No. 11/142,765, Jan. 8, 2010, 17 pgs.
Betz, Office Action, U.S. Appl. No. 11/142,765, May 9, 2008, 20 pgs.
Betz, Office Action, U.S. Appl. No. 11/142,765, Jan. 17, 2008, 16 pgs.
Betz, Office Action, U.S. Appl. No. 11/142,765, Oct. 17, 2007, 14 pgs.
Betz, Office Action, U.S. Appl. No. 11/142,765, Oct. 17, 2008, 17 pgs.
Betz, Office Action, U.S. Appl. No. 11/142,765, Jun. 18, 2007, 13 pgs.
Betz, Office Action, U.S. Appl. No. 11/142,765, Apr. 28, 2009, 16 pgs.
Betz, Office Action, U.S. Appl. No. 11/341,069, Apr. 1, 2008, 8 pgs.
Betz, Office Action, U.S. Appl. No. 11/394,414, Mar. 5, 2010, 24 pgs.
Betz, Office Action, U.S. Appl. No. 11/394,414, Sep. 15, 2009, 16 pgs.
Betz, Office Action, U.S. Appl. No. 11/394,552, Apr. 1, 2008, 14 pgs.
Betz, Office Action, U.S. Appl. No. 11/394,552, Aug. 4, 2010, 19 pgs.
Betz, Office Action, U.S. Appl. No. 11/394,552, Feb. 8, 2011, 22 pgs.
Betz, Office Action, U.S. Appl. No. 11/394,552, Jul. 8, 2011, 13 pgs.
Betz, Office Action, U.S. Appl. No. 11/394,552, Apr. 11, 2012, 15 pgs.
Betz, Office Action, U.S. Appl. No. 11/394,552, Nov. 12, 2008, 11 pgs.
Betz, Office Action, U.S. Appl. No. 11/394,552, Jan. 13, 2010, 15 pgs.
Betz, Office Action, U.S. Appl. No. 11/394,552, Mar. 13, 2009, 12 pgs.
Betz, Office Action, U.S. Appl. No. 11/394,552, Apr. 23, 2013, 21 pgs.
Betz, Office Action, U.S. Appl. No. 11/394,552, Sep. 24, 2012, 21 pgs.
Betz, Office Action, U.S. Appl. No. 12/939,981, Dec. 9, 2010, 12 pgs.
Betz, Office Action, U.S. Appl. No. 13/302,755, Mar. 25, 2013, 15 pgs.
Brill, An analysis of the askMSR question-answering system, Jul. 2002, 8 pgs.
Brin, Extracting patterns and relations from the world wide web, 1999, 12 pgs.
Brin, The anatomy of a large-scale hypertextual search engine, Apr. 14-18, 1998, 26 pgs.
Bunescu, Using encyclopedia knowledge for named entity disambiguation, Dec. 28, 2006, 8 pgs.
Chang, IEPAD: Information extraction based on pattern discovery, May 1-5, 2001, 8 pgs.
Chen, A scheme for inference problems using rough sets and entropy, Aug. 31-Sep. 3, 2005, 10 pgs.
Chu-Carroll, A multi-strategy and multi-source approach to question answering, 2006, 8 pgs.
Cover, Entropy, relative entropy and mutual information, Chapter 2 Elements of Information Theory, 1991, 13 pgs.
Craswell, Effective site finding using link anchor information, Sep. 9-12, 2001, 8 pgs.
Dean, MapReduce: Simplified data processing on large clusters, 2004, 13 pgs.
Dean, Using design recovery techniques to transform legacy systems, 2001, 10 pgs.
Dong, Reference reconciliation in complex information spaces, 2005, 12 pgs.
Downey, Learning text patterns for web information extraction and assessment, 2002, 6 pgs.
Etzioni, Unsupervised named-entity extraction from the web: an experimental study, Feb. 28, 2005, 42 pgs.
Etzioni, Web-scale information extraction in knowitall (preliminary results), May 17-22, 2004, 11 pgs.
Freitag, Boosted wrapped induction, 2000, 7 pgs.
Gao, Learning information extraction patterns from tabluar web pages without manual labelling, Oct. 13-17, 2009, 4 pgs.
Gigablast, Web/Directory, printed Aug. 24, 2010, 1 pg.
Google Inc., International Search Report / Written Opinion, PCT/US2006/007639, Sep. 13, 2006, 5 pgs.

(56) References Cited

OTHER PUBLICATIONS

Google Inc., International Search Report / Written Opinion, PCT/US2006/010965, Jul. 5, 2006, 4 pgs.
Google Inc., International Search Report / Written Opinion, PCT/US2006/019807, Dec. 18, 2006, 4 pgs.
Google Inc., International Search Report / Written Opinion, PCT/US2007/061156, Feb. 11, 2008, 5 pgs.
Google Inc., Office Action, CA 2603085, Sep. 18, 2012, 2 pgs.
Google Inc., Office Action, CA 2610208, Sep. 21, 2011, 3 pgs.
Google Inc., Office Action, EP 06784449.8, Mar. 26, 2012, 7 pgs.
Google Inc., Office Action, JP 2008-504204, Oct. 12, 2011, 4 pgs.
Gray, Entropy and information theory, 1990, 30 pgs.
Guha, Disambiguating people in search, May 17-2, 2004, 9 pgs.
Guha, Object co-identification on the semantic web, May 17-22, 2004, 9 pgs.
Haveliwala, Topic-sensitive pagerank, May 7-11, 2002, 23 pgs.
Hogue, Examiner's Answer, U.S. Appl. No. 11/142,748, Oct. 3, 2011, 23 pgs.
Hogue, Notice of Allowance, U.S. Appl. No. 11/097,689, Apr. 30, 2009, 8 pgs.
Hogue, Notice of Allowance, U.S. Appl. No. 11/356,837, Jan. 6, 2012, 12 pgs.
Hogue, Notice of Allowance, U.S. Appl. No. 11/356,837, Apr. 27, 2012, 7 pgs.
Hogue, Notice of Allowance, U.S. Appl. No. 12/546,578, Jan. 6, 2011, 8 pgs.
Hogue, Notice of Allowance, U.S. Appl. No. 12/546,578, Jul. 12, 2011, 10 pgs.
Hogue, Notice of Allowance, U.S. Appl. No. 13/206,457, Mar. 14, 2012, 9 pgs.
Hogue, Notice of Allowance, U.S. Appl. No. 13/549,361, Oct. 2, 2013, 9 pgs.
Hogue, Notice of Allowance, U.S. Appl. No. 13/549,361, Jun. 26, 2013, 8 pgs.
Hogue, Notice of Allowance, U.S. Appl. No. 13/603,354, Nov. 12, 2013, 9 pgs.
Hogue, Notice of Allowance, U.S. Appl. No. 13/603,354, Jun. 26, 2013, 8 pgs.
Hogue, Office Action, U.S. Appl. No. 11/097,689, Oct. 3, 2008, 13 pgs.
Hogue, Office Action, U.S. Appl. No. 11/097,689, Apr. 9, 2008, 11 pgs.
Hogue, Office Action, U.S. Appl. No. 11/097,689, Jun. 21, 2007, 9 pgs.
Hogue, Office Action, U.S. Appl. No. 11/097,689, Nov. 27, 2007, 10 pgs.
Hogue, Office Action, U.S. Appl. No. 11/142,748, Dec. 7, 2007, 13 pgs.
Hogue, Office Action, U.S. Appl. No. 11/142,748, Jul. 13, 2010, 12 pgs.
Hogue, Office Action, U.S. Appl. No. 11/142,748, Aug. 17, 2009, 14 pgs.
Hogue, Office Action, U.S. Appl. No. 11/142,748, Nov. 17, 2010, 14 pgs.
Hogue, Office Action, U.S. Appl. No. 11/142,748, May 18, 2007, 9 pgs.
Hogue, Office Action, U.S. Appl. No. 11/142,748, Jul. 22, 2008, 18 pgs.
Hogue, Office Action, U.S. Appl. No. 11/142,748, Aug. 23, 2007, 13 pgs.
Hogue, Office Action, U.S. Appl. No. 11/142,748, Jan. 27, 2009, 17 pgs.
Hogue, Office Action, U.S. Appl. No. 11/356,837, Jun. 3, 2011, 18 pgs.
Hogue, Office Action, U.S. Appl. No. 11/356,837, Aug. 4, 2010, 20 pgs.
Hogue, Office Action, U.S. Appl. No. 11/356,837, Feb. 8, 2011, 14 pgs.
Hogue, Office Action, U.S. Appl. No. 11/356,837, May 11, 2009, 18 pgs.
Hogue, Office Action, U.S. Appl. No. 11/356,837, Feb. 19, 2010, 20 pgs.
Hogue, Office Action, U.S. Appl. No. 11/356,837, Mar. 21, 2008, 15 pgs.
Hogue, Office Action, U.S. Appl. No. 11/356,837, Oct. 27, 2009, 20 pgs.
Hogue, Office Action, U.S. Appl. No. 11/356,837, Sep. 30, 2008, 20 pgs.
Hogue, Office Action, U.S. Appl. No. 11/399,857, Mar. 1, 2012, 25 pgs.
Hogue, Office Action, U.S. Appl. No. 11/399,857, Mar. 3, 2011, 15 pgs.
Hogue, Office Action, U.S. Appl. No. 11/399,857, Jan. 5, 2009, 21 pgs.
Hogue, Office Action, U.S. Appl. No. 11/399,857, Jun. 8, 2009, 14 pgs.
Hogue, Office Action, U.S. Appl. No. 11/399,857, Sep. 13, 2010, 13 pgs.
Hogue, Office Action, U.S. Appl. No. 11/399,857, Jun. 24, 2011, 14 pgs.
Hogue, Office Action, U.S. Appl. No. 11/399,857, Dec. 28, 2009, 11 pgs.
Hogue, Office Action, U.S. Appl. No. 11/399,857, Mar. 31, 2008, 23 pgs.
Hogue, Office Action, U.S. Appl. No. 12/546,578, Aug. 4, 2010, 10 pgs.
Hogue, Office Action, U.S. Appl. No. 13/206,457, Oct. 28, 2011, 6 pgs.
Hogue, Office Action, U.S. Appl. No. 13/549,361, Oct. 4, 2012, 18 pgs.
Hogue, Office Action, U.S. Appl. No. 13/549,361, Mar. 6, 2013, 13 pgs.
Hogue, Office Action, U.S. Appl. No. 13/603,354, Jan. 9, 2013, 5 pgs.
Hogue, Tree pattern inference and matching for wrapper induction on the world wide web, Jun. 2004, 106 pgs.
Hsu, Finite-state transducers for semi-structured text mining, 1999.
Ilyas, Rank-aware query optimization, Jun. 13-18, 2004, 12 pgs.
Information entropy, Wikipedia, May 3, 2006, 9 pgs.
Jeh, Scaling personalized web search, May 20-24, 2003, 24 pgs.
Ji, Re-ranking algorithms for name tagging, Jun. 2006, 8 pgs.
Jones, Bootstrapping for text learning tasks, 1999, 12 pgs.
Koeller, Approximate matching of textual domain attributes for information source integration, Jun. 17, 2005, 10 pgs.
Kolodner, Indexing and retrieval strategies for natural language fact retrieval, Sep. 1983, 31 pgs.
Kosala, Web mining research, Jul. 2000, 14 pgs.
Kosseim, Answer formulation for question-answering, Oct. 1, 2007, 11 pgs.
Laroco, Notice of Allowance, U.S. Appl. No. 11/551,657, May 13, 2011, 8 pgs.
Laroco, Notice of Allowance, U.S. Appl. No. 11/551,657, Sep. 28, 2011, 8 pgs.
Laroco, Notice of Allowance, U.S. Appl. No. 13/364,244, Aug. 6, 2013, 6 pgs.
Laroco, Notice of Allowance, U.S. Appl. No. 13/364,244, Feb. 7, 2014, 5 pgs.
Laroco, Office Action, U.S. Appl. No. 11/551,657, Aug. 1, 2008, 15 pgs.
Laroco, Office Action, U.S. Appl. No. 11/551,657, Aug. 13, 2009, 16 pgs.
Laroco, Office Action, U.S. Appl. No. 11/551,657, Nov. 17, 2010, 20 pgs.
Laroco, Office Action, U.S. Appl. No. 11/551,657, Feb. 24, 2010, 17 pgs.
Laroco, Office Action, U.S. Appl. No. 11/551,657, Jan. 28, 2009, 17 pgs.
Laroco, Office Action, U.S. Appl. No. 13/364,244, Dec. 19, 2013, 5 pgs.
Laroco, Office Action, U.S. Appl. No. 13/364,244, Jan. 30, 2013, 8 pgs.
Lin, Question answering from the web using knowledge annotation and knowledge mining techniques, Nov. 3-8, 2003, 8 pgs.

(56) References Cited

OTHER PUBLICATIONS

Liu, Mining data records in web pages, 2000, 10 pgs.
MacKay, Information theory, inference and learning algorithms, 2003, 15 pgs.
Mann, Unsupervised personal name disambiguation, 2003, 8 pgs.
McCallum, Object consolidation by graph partitioning with a conditionally-trained distance metric, Aug. 24-27, 2003, 6 pgs.
Merriam Webster Dictionary defines "normalize" as "to make conform to or reduce to a norm or standard", 1865, 2 pgs.
Merriam Webster Dictionary defines "value" as "a numerical quantity that is assigned or is determined by . . . ", 1300, 2 pgs.
Microsoft Computer Dictionary defines "normalize" as "adjust number within specific range", May 1, 2002, 4 pgs.
Microsoft Computer Dictionary defines "quantity" as a "number", May 1, 2002, 4 pgs.
Microsoft Computer Dictionary defines "value" as a "quantity", May 1, 2002, 4 pgs.
Mihalcea, PageRank on semantic networks with application to word sense disambiguation, Aug. 23-27, 2004, 7 pgs.
Mihalcea, TextRank: bringing order into texts, Jul. 2004, 8 pgs.
Nadeau, Unsupervised named-entity recognition: generating gazetteers and resolving ambiguity, Aug. 1, 2006, 12 pgs.
Nyberg, The JAVELIN question-answering system at TREC 2003, Nov. 18-21, 2003, 9 pgs.
Ogden, Improving cross-language text retrieval with human interactions, Jan. 2000, 9 pgs.
Page, The pagerank citation ranking: bringing order to the web, 1998, 17 pgs.
Pawson, Sorting and grouping, Feb. 7, 2004, 19 pgs.
Plaisant, Interface and data architecture for query preview in networked information systems, Jul. 1999, 28 pgs.
Prager, IBM's piquant in TREC2003, Nov. 18-21, 2003, 10 pgs.
Prager, Question answering using constraint satisfaction: QA-by-dossier-with-constraints, 2004, 8 pgs.
Ramakrishnan, Is question answering an acquired skill?, May 17-22, 2004, 10 pgs.
Richardson, Beyond page rank: machine learning for static ranking, May 23, 2006, 9 pgs.
Richardson, The intelligent surfer: probabilistic combination of link and content information in pagerank, 2002, 8 pgs.
Riloff, Learning dictionaries for information extraction by multi-level bootstrapping, 1999, 6 pgs.
Rohde, Notice of Allowance, U.S. Appl. No. 11/097,690, Dec. 23, 2010, 8 pgs.
Rohde, Office Action, U.S. Appl. No. 11/097,690, May 1, 2008, 21 pgs.
Rohde, Office Action, U.S. Appl. No. 11/097,690, Jun. 9, 2010, 11 pgs.
Rohde, Office Action, U.S. Appl. No. 11/097,690, Oct. 15, 2008, 22 pgs.
Rohde, Office Action, U.S. Appl. No. 11/097,690, Aug. 27, 2009, 13 pgs.
Rohde, Office Action, U.S. Appl. No. 11/097,690, Apr. 28, 2009, 9 pgs.
Rohde, Office Action, U.S. Appl. No. 11/097,690, Sep. 28, 2007, 17 pgs.
Shamsi, Final Office Action, U.S. Appl. No. 13/171,296, Nov. 4, 2013, 29 pgs.
Shamsi, Notice of Allowance, U.S. Appl. No. 11/781,891, Oct. 25, 2010, 7 pgs.
Shamsi, Notice of Allowance, U.S. Appl. No. 11/781,891, May 27, 2010, 6 pgs.
Shamsi, Office Action, U.S. Appl. No. 11/781,891, Nov. 16, 2009, 10 pgs.
Shamsi, Office Action, U.S. Appl. No. 13/171,296, Apr. 3, 2013, 7 pgs.
Shannon, a mathematical theory of communication, Oct. 1948, 55 pgs.
Sun Microsystems, Attribute names, Feb. 17, 2004, 2 pgs.
Vespe, Notice of Allowance, U.S. Appl. No. 11/686,217, Aug. 27, 2012, 11 pgs.
Vespe, Notice of Allowance, U.S. Appl. No. 11/745,605, Jun. 13, 2011, 9 pgs.
Vespe, Notice of Allowance, U.S. Appl. No. 11/745,605, Sep. 22, 2011, 9 pgs.
Vespe, Notice of Allowance, U.S. Appl. No. 11/745,605, Mar. 28, 2012, 10 pgs.
Vespe, Office Action, U.S. Appl. No. 11/686,217, Sep. 10, 2010, 14 pgs.
Vespe, Office Action, U.S. Appl. No. 11/686,217, Jan. 26, 2012, 12 pgs.
Vespe, Office Action, U.S. Appl. No. 11/686,217, Mar. 26, 2010, 13 pgs.
Vespe, Office Action, U.S. Appl. No. 11/745,605, Apr. 8, 2010, 15 pgs.
Vespe, Office Action, U.S. Appl. No. 11/745,605, Jul. 30, 2009, 17 pgs.
Wang, Combining link and contents in clustering web search results to improve information interpretation, 2002, 9 pgs.
Wirzenius, C preprocessor trick for implementing similar data types, Jan. 17, 2000, 9 pgs.
Zhao, Corroborate and learn facts from the web, Aug. 12-15, 2007, 9 pgs.
Zhao, Notice of Allowance, U.S. Appl. No. 11/394,610, May 11, 2009, 15 pgs.
Zhao, Notice of Allowance, U.S. Appl. No. 11/941,382, Apr. 14, 2014, 5 pgs.
Zhao, Office Action, U.S. Appl. No. 11/142,853, Oct. 2, 2009, 10 pgs.
Zhao, Office Action, U.S. Appl. No. 11/142,853, Sep. 5, 2008, 9 pgs.
Zhao, Office Action, U.S. Appl. No. 11/142,853, Mar. 17, 2009, 9 pgs.
Zhao, Office Action, U.S. Appl. No. 11/142,853, Jan. 25, 2008, 7 pgs.
Zhao, Office Action, U.S. Appl. No. 11/394,610, Apr. 1, 2008, 18 pgs.
Zhao, Office Action, U.S. Appl. No. 11/394,610, Nov. 13, 2008, 18 pgs.
Zhao, Office Action, U.S. Appl. No. 11/941,382, Sep. 8, 2011, 28 pgs.
Zhao, Office Action, U.S. Appl. No. 11/941,382, Aug. 12, 2010, 23 pgs.
Zhao, Office Action, U.S. Appl. No. 11/941,382, May 24, 2012, 26 pgs.
Zhao, Office Action, U.S. Appl. No. 11/941,382, Nov. 26, 2012, 24 pgs.
Zhao, Office Action, U.S. Appl. No. 11/941,382, Jan. 27, 2011, 24 pgs.
Zhao, Office Action, U.S. Appl. No. 11/941,382, Sep. 27, 2013, 30 pgs.
Zhao, Office Action, U.S. Appl. No. 11/941,382, Dec. 29, 2009, 25 pgs.
Notice of Allowance for U.S. Appl. No. 11/394,552, mailed Jul. 31, 2015, 15 Pages.
Final Office Action for U.S. Appl. No. 13/171,296, mailed Apr. 2, 2015, 31 pages.
Final Office Action for U.S. Appl. No. 13/732,157, mailed Dec. 24, 2015, 27 Pages.
Non-Final Office Action for U.S. Appl. No. 13/732,157, mailed May 21, 2015, 9 pages.
Final Office Action for U.S. Appl. No. 14/151,721, mailed Apr. 16, 2015, 15 pages.
Final Office Action for U.S. Appl. No. 14/151,721, mailed Feb. 25, 2016, 14 Pages.
Non-Final Office Action for U.S. Appl. No. 14/151,721, mailed Oct. 16, 2015, 17 pages.
Notice of Allowance for U.S. Appl. No. 14/194,534, mailed Mar. 23, 2015, 7 pages.
Final Office Action for U.S. Appl. No. 14/300,148, mailed Jun. 2, 2016, 13 pages.
Non Final Office Action for U.S. Appl. No. 14/300,148, mailed Jan. 5, 2016, 16 Pages.

(56) References Cited

OTHER PUBLICATIONS

Final Office Action for U.S. Appl. No. 14/457,869, mailed Jun. 1, 2016, 13 Pages.
Non Final Office Action for U.S. Appl. No. 14/457,869, mailed Jan. 5, 2016, 16 Pages.
Final Office Action for U.S. Appl. No. 14/463,393, mailed Feb. 12, 2016, 36 pages.
Non Final Office Action for U.S. Appl. No. 14/463,393, mailed Jun. 26, 2015, 14 Pages.
Office Action for EP Application No. EP06739646.5, mailed Jul. 1, 2015, 4 Pages.
Gilster, "Get fast answers, easily", Newsobserver.com (http://web.archive.org/web/20050308154148/http://newsobserver.com/business/technology/gilster/2003/story/1258931p-7372446c.html), May 14, 2003, 2 pages.
Katz, et al., "Omnibase: Uniform Access to Heterogeneous Data for Question Answering", Natural Language Processing and Information Systems, vol. 2553 of the series Lecture Notes in Computer Science, Springer Berlin Heidelberg, 2002, pp. 230-234.
Kwok, et al., "Scaling question answering to the web", ACM Transactions on Information Systems, vol. 19, No. 3, Jul. 2001, pp. 242-262.
Lam, et al., "Querying Web Data—The WebQA Approach", Proceedings of the 3rd International Conference on Web Information Systems Engineering, IEEE, 2002, pp. 139-148.
Lopez, et al., "AquaLog: An Ontology-Portable Question Answering System for the Semantic Web", The Semantic Web: Research and Applications, vol. 3532 of the series Lecture Notes in Computer Science, Springer Berlin Heidelberg, 2005, pp. 546-562.
Mahlin, et al., "DOrAM: Real Answers to Real Questions", AAMA'02, ACM, 2002, pp. 792-793.
Pradhan, et al., "Building a Foundation System for Producing Short Answers to Factual Questions", Proceedings of the Eleventh Text Retrieval Conference (TREC 2002), NIST Special Publication SP 500-251, 2003, pp. 1-10.

\* cited by examiner

Example Format of Facts in Repository (each fact is associated with an object ID)

Example Facts in Repository (each fact is associated with an object ID)

Example Object Reference Table

Example Format of Facts in Repository (each fact is associated with an object ID)

Example Objects

ADVERTISEMENT

Britney Spears pictures, picture gallery, celebrity greeting cards, photos, pics, snaps, high quality pictures, rare pictures.

Profile
check whether you know these

Biography
a detailed story of Britney Spears

Photo Gallery
check out the multiple picture galleries

Related Sites

PROFILE

| NAME: | BRITNEY SPEARS |
|---|---|
| PROFESSION: | ACTRESS, SINGER |
| DATE OF BIRTH: | DECEMBER 2, 1981 |
| PLACE OF BIRTH: | KENTWOOD, LA |
| SIGN: | SAGITTARIUS |
| EYE COLOR: | BROWN |
| HAIR COLOR: | BROWN |

BIOGRAPHY

To say that Britney Spears's life has changed over the course of the past

Welcome to the *Unofficial* Britney Spears Page

Here are some things they don't want you to know.

504

Name
*Britney J. Spears*

Date of Birth
*December 2, 1981*

Favorite Food
*Chicken Parmesan*

Favorite Movie
*Back to the Future*

Profession
*Singer-Songwriter*

Check out our advertisements

FIG. 5

UNSUPERVISED EXTRACTION OF FACTS

RELATED APPLICATIONS

This application is a continuation of U.S. application Ser. No. 11/394,414, entitled, "Unsupervised Extraction of Facts," by Jonathan Betz and Shubin Zhao, filed on Mar. 31, 2006, which is a continuation-in-part of U.S. application Ser. No. 11/142,853, entitled, "Learning Facts from Semi-Structured Text," by Shubin Zhao and Jonathan T. Betz, filed on May 31, 2005, now U.S. Pat. No. 7,769,579, issued on Aug. 3, 2010, all of which are hereby incorporated by reference.

This application is related to the following applications, all of which are hereby incorporated by reference:

- U.S. application Ser. No. 11/024,784, entitled, "Supplementing Search Results with Information of Interest", by Jonathan Betz, filed on Dec. 30, 2004;
- U.S. application Ser. No. 11/142,765, entitled, "Identifying the Unifying Subject of a Set of Facts", by Jonathan Betz, filed on May 31, 2005;
- U.S. application Ser. No. 11/097,588, entitled, "Corroborating Facts Extracted from Multiple Sources", by Jonathan Betz, filed on Mar. 31, 2005;
- U.S. application Ser. No. 11/366,162, entitled "Generating Structured Information," filed Mar. 1, 2006, by Egon Pasztor and Daniel Egnor;
- U.S. application Ser. No. 11/357,748, entitled "Support for Object Search", filed Feb. 17, 2006, by Alex Kehlenbeck, Andrew W. Hogue;
- U.S. application Ser. No. 11/342,290, entitled "Data Object Visualization", filed on Jan. 27, 2006, by Andrew W. Hogue, David Vespe, Alex Kehlenbeck, Mike Gordon, Jeffrey C. Reynar, David Alpert;
- U.S. application Ser. No. 11/342,293, entitled "Data Object Visualization Using Maps", filed on Jan. 27, 2006, by Andrew W. Hogue, David Vespe, Alex Kehlenbeck, Mike Gordon, Jeffrey C. Reynar, David Alpert;
- U.S. application Ser. No. 11/356,679, entitled "Query Language", filed Feb. 17, 2006, by Andrew W. Hogue, Doug Rohde;
- U.S. application Ser. No. 11/356,837, entitled "Automatic Object Reference Identification and Linking in a Browseable Fact Repository", filed Feb. 17, 2006, by Andrew W. Hogue;
- U.S. application Ser. No. 11/356,851, entitled "Browseable Fact Repository", filed Feb. 17, 2006, by Andrew W. Hogue, Jonathan T. Betz;
- U.S. application Ser. No. 11/356,842, entitled "ID Persistence Through Normalization", filed Feb. 17, 2006, by Jonathan T. Betz, Andrew W. Hogue;
- U.S. application Ser. No. 11/356,728, entitled "Annotation Framework", filed Feb. 17, 2006, by Tom Richford, Jonathan T. Betz;
- U.S. application Ser. No. 11/341,069, entitled "Object Categorization for Information Extraction", filed on Jan. 27, 2006, by Jonathan T. Betz;
- U.S. application Ser. No. 11/356,838, entitled "Modular Architecture for Entity Normalization", filed Feb. 17, 2006, by Jonathan T. Betz, Farhan Shamsi;
- U.S. application Ser. No. 11/356,765, entitled "Attribute Entropy as a Signal in Object Normalization", filed Feb. 17, 2006, by Jonathan T. Betz, Vivek Menezes;
- U.S. application Ser. No. 11/341,907, entitled "Designating Data Objects for Analysis", filed on Jan. 27, 2006, by Andrew W. Hogue, David Vespe, Alex Kehlenbeck, Mike Gordon, Jeffrey C. Reynar, David Alpert;
- U.S. application Ser. No. 11/342,277, entitled "Data Object Visualization Using Graphs", filed on Jan. 27, 2006, by Andrew W. Hogue, David Vespe, Alex Kehlenbeck, Mike Gordon, Jeffrey C. Reynar, David Alpert;
- U.S. application Ser. No. 11/394,508, entitled "Entity Normalization Via Name Normalization", filed on Mar. 31, 2006, by Jonathan T. Betz;
- U.S. application Ser. No. 11/394,610, entitled "Determining Document Subject by Using Title and Anchor Text of Related Documents", filed on Mar. 31, 2006, by Shubin Zhao;
- U.S. application Ser. No. 11/394,552, entitled "Anchor Text Summarization for Corroboration", filed on Mar. 31, 2006, by Jonathan T. Betz and Shubin Zhao;
- U.S. application Ser. No. 11/399,857, entitled "Mechanism for Inferring Facts from a Fact Repository", filed on Mar. 31, 2006, by Andrew Hogue and Jonathan Betz.

TECHNICAL FIELD

The disclosed embodiments relate generally to fact databases. More particularly, the disclosed embodiments relate to extracting facts from documents.

BACKGROUND

The internet provides access to a wealth of information. Documents created by authors all over the world are freely available for reading, indexing, and extraction of information. This incredible diversity of fact and opinion that make the internet the ultimate information source.

However, this same diversity of information creates a considerable challenge when extracting information. Information may be presented in a variety of formats, languages, and layouts. A human user may (or may not) be able to decipher individual documents to gather the information contained therein, but these differences may confuse or mislead an automated extraction system, resulting in information of little or no value. Extracting information from documents of various formats poses a formidable challenge to efforts to create an automated extraction system.

SUMMARY

A system and method for extracting facts from documents. A fact is extracted from a first document. The attribute and value of the fact extracted from the first document is used as a seed attribute-value pair. A second document containing the seed attribute-value pair is analyzed to determine a contextual pattern used in the second document. The contextual pattern is used to extract other attribute-value pairs from the second document. The extracted attributes and values are stored as facts.

BRIEF DESCRIPTION OF THE DRAWINGS

FIG. 3(*b*) is a block diagram illustrating the extraction of facts from a plurality of documents to produce an object, according to one embodiment of the present invention.

FIG. 4 is an example of a document which can be processed using predefined patterns, according to one embodiment of the present invention.

FIG. 5 is an example of a document which can be processed using contextual patterns, according to one embodiment of the present invention.

DESCRIPTION OF EMBODIMENTS

Embodiments of the present invention are now described with reference to the figures where like reference numbers indicate identical or functionally similar elements.

Figure 1:
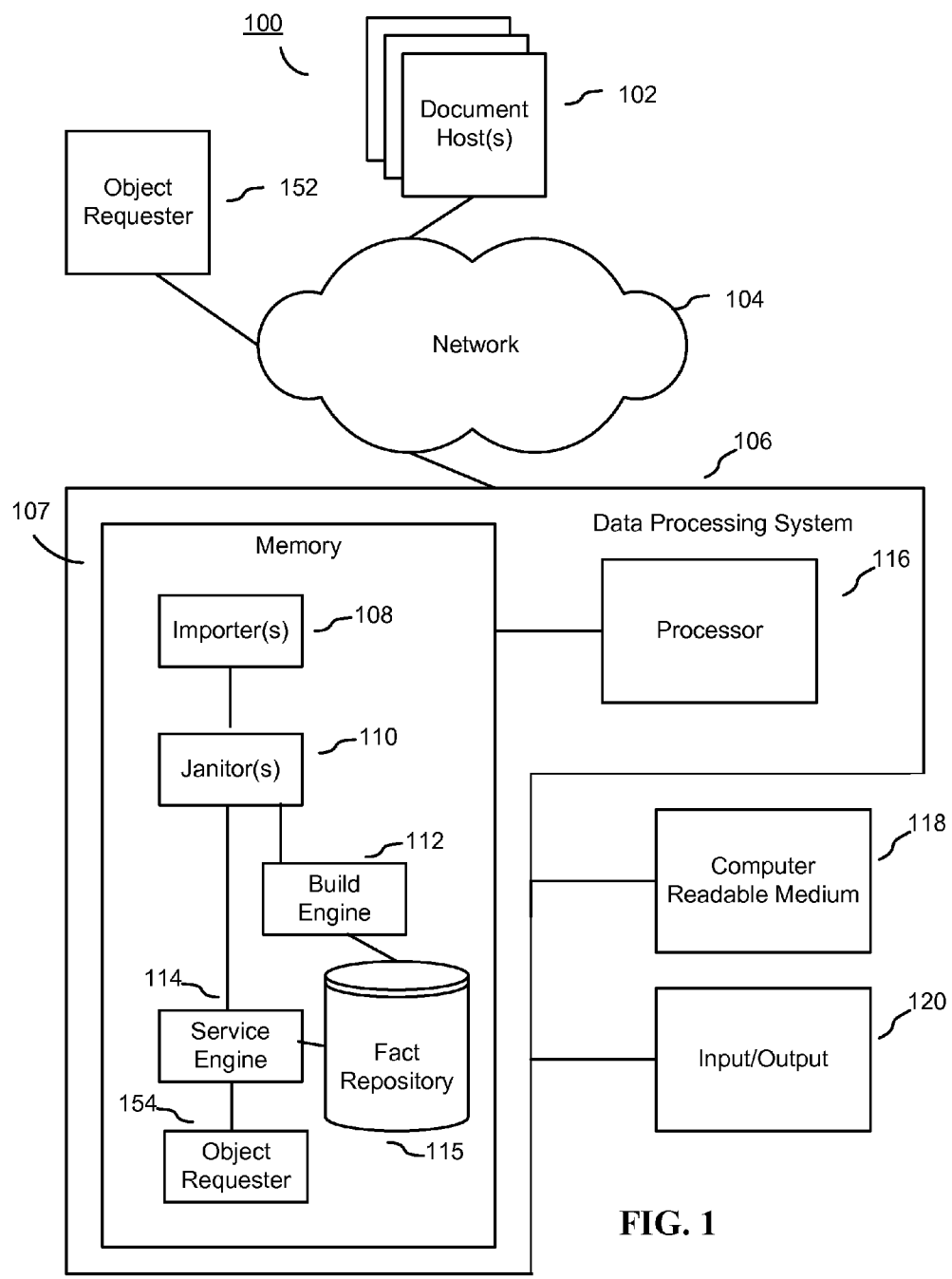
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "Dec. 2, 1981" while on another page that her date of birth is "Dec. 2, 1981." Birthday and Date of Birth might both be rewritten as Birthdate by one janitor and then another janitor might notice that Dec. 2, 1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(*a*)-2(*d*).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network.

For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Figure 2A:
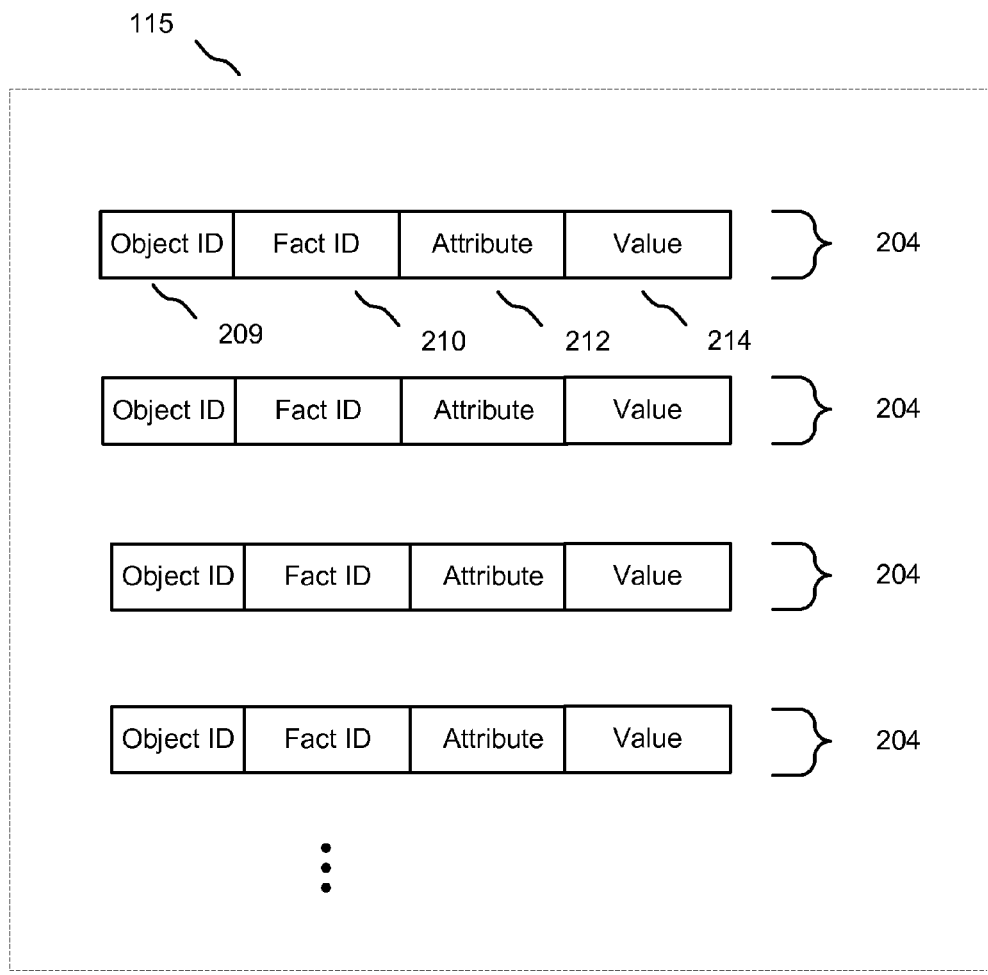
FIGS. 2(a)-2(d) are block diagrams illustrating a data structure for facts within a repository of FIG. 1 in accordance with preferred embodiments of the invention.

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
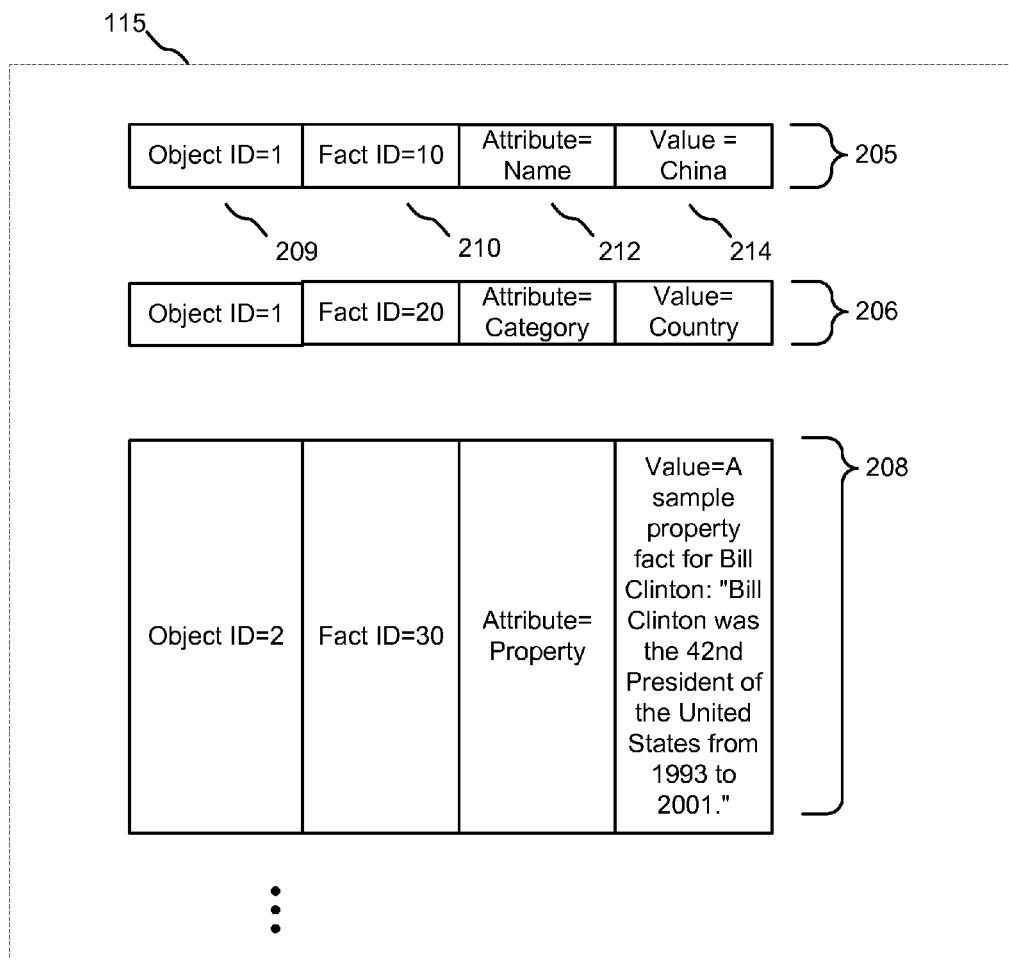

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
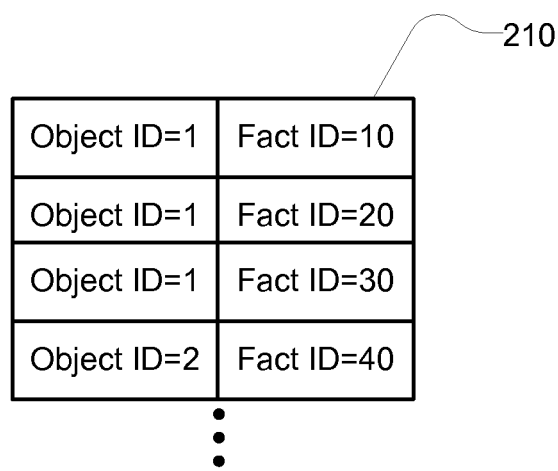

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
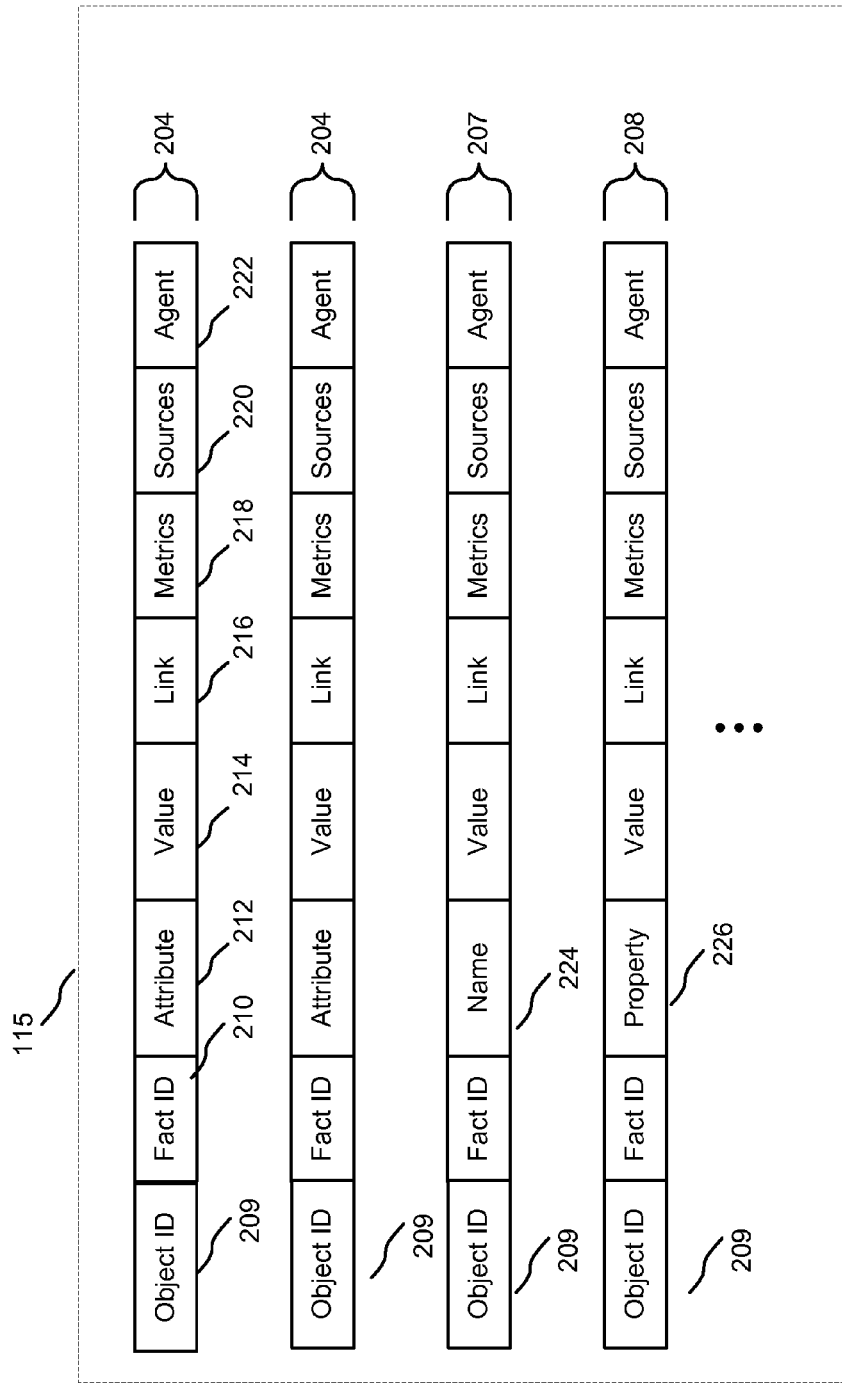

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." "Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
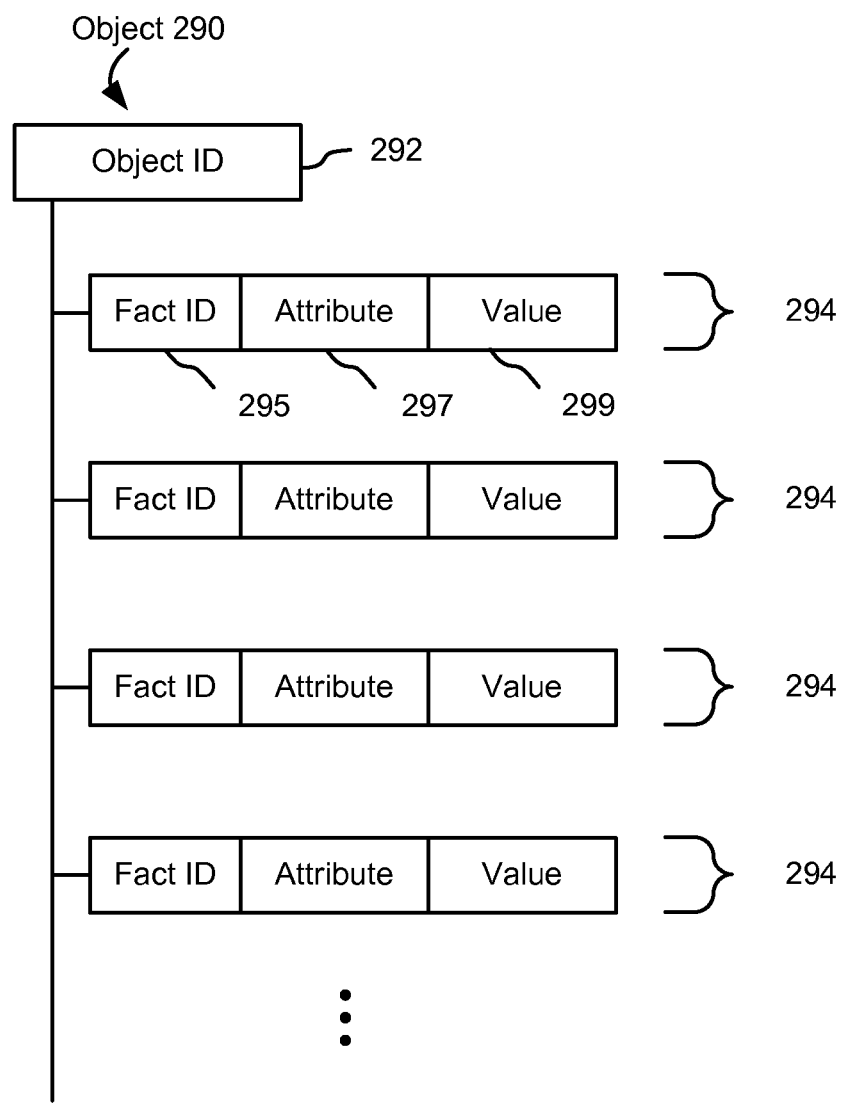
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Figure 3A:
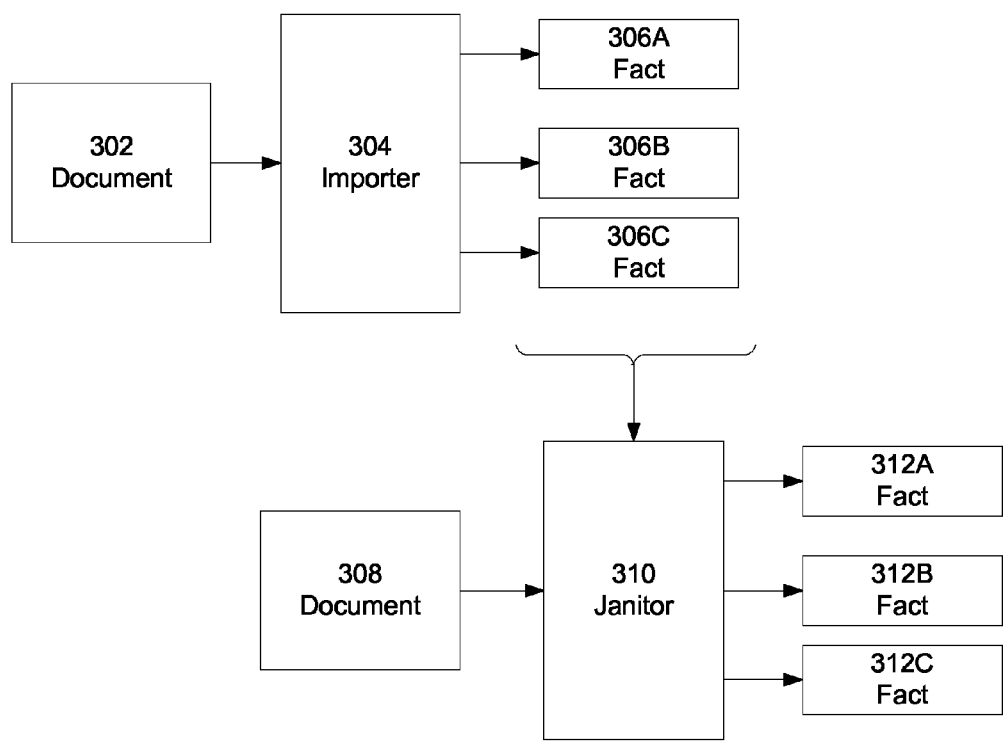
FIG. 3(*a*) is a block diagram illustrating the extraction of facts from a plurality of documents, according to one embodiment of the present invention.

FIG. 3(a) is a block diagram illustrating the extraction of facts from a plurality of documents, according to one embodiment of the present invention. Document 302 and document 308 are analogous to the documents described herein with reference to FIG. 1. According to one embodiment of the present invention, the document 302 and the document 308 are stored in a document repository (not shown).

The importer 304 processes the document 302 and extracts facts 306. The importer 304 may employ any of a variety of methods for extracting the facts 306 from the document 302, such as one of those described in "Supplementing Search Results with Information of Interest" or in the other incorporated applications. For the purposes of illustration, a single document 302 is shown in the figure. In practice, importer 304 can process a plurality of documents 302 to extract the facts 306.

According to one embodiment of the present invention, the importer 304 identifies a predefined pattern in the document 302 and applies the predefined pattern to extract attribute-value pairs. The extracted attribute-value pairs are then stored as facts 306. As described in "Supplementing Search Results with Information of Interest", a predefined pattern defines specific, predetermined sections of the document which are expected to contain attributes and values. For example, in an HTML document, the presence of a text block such as "<BR>*:*<BR>" (where '*' can be any string) may indicate that the document contains an attribute-value pair organized according to the pattern "<BR>(attribute text):(value text)<BR>". Such a pattern is predefined in the sense that it is one of a known list of patterns to be identified and applied for extraction in documents. Of course, not every predefined pattern will necessarily be found in every document; identifying the patterns contained in a document determines which (if any) of the predefined patterns may be used for extraction on that document with a reasonable expectation of producing valid attribute-value pairs. The extracted attribute-value pairs are stored in the facts 306.

An attribute-value pair is composed of an attribute and its associated value. An attribute-value pair may be stored as a fact, for example, by storing the attribute in the attribute field of the fact and the value in the value field of the fact. Extracting a fact is synonymous with extracting at least an attribute-value pair and storing the attribute and value as a fact.

In the example illustrated, document 302 contains at least some attribute-value pairs organized according to one of the predefined patterns recognizable by the importer 304. An example of a document containing attribute-value pairs organized according to one of the predefined patterns recognizable by the importer 304 is described herein with reference to FIG. 4. Applying predefined patterns to documents containing attribute-value pairs organized according to those patterns beneficially extracts valuable information without the need for human supervision.

However, the document 302 may contain other attribute-value pairs organized differently, such that applying one of the predefined patterns recognizable by the importer 304 produces incomplete, inconsistent, or erroneous results. Similarly, a document such as the document 308 may contain attribute-value pairs organized in a manner different from those prescribed by the various predefined patterns. It is possible that, the importer 304 were applied to the document 308, none of the predefined patterns recognizable by the importer 304 would be identified in the document 308.

Advantageously, one embodiment of the present invention facilitates the extraction of attribute-value pairs organized according to a pattern not itself recognizable by the importer 304. According to one embodiment of the present invention, a janitor 310 receives the facts 306 and the document 308. If the document 308 contains the same (or similar) attribute-value pairs as at least some of the facts 306, the facts 306 may be used to identify a contextual pattern in the document 308. A contextual pattern is a pattern that is inferred on the basis of the context in which known attribute-value pairs appear in a document. An example of a contextual pattern in a document is described herein with reference to FIG. 5. The janitor 310 applies the contextual pattern to the document 308 to extract additional attribute-value pairs. These attribute-value pairs are then stored as the facts 312. Several exemplary methods for identifying a contextual pattern and using it to extract attribute-value pairs are described in "Learning Facts from Semi-Structured Text."

According to one embodiment of the present invention the janitor 310 additionally corroborates the facts 306 using a corroborating document (not shown). For example, as a result of improperly applied predefined patterns (or the document 302 itself), some of the facts 306 may contain errors, inconsistent information, or other factual anomalies. If the attribute-value pair of the fact 306A cannot be found in any corroborating document, the janitor 310 may reduce the confidence score of the fact 306A. Alternatively, if the attribute-value pair of the fact 306A is identified in a corroborating document, the confidence score of the fact 306A can be increased, and a reference to the corroborating document can be added to the list of sources for that fact. Several exemplary methods for corroborating facts can be found in "Corroborating Facts Extracted from Multiple Sources."

According to one embodiment of the present invention, a plurality of documents are used to import and corroborate a group of facts. From this group of imported facts, those associated with a common name may be aggregated to form the facts 306. The facts 306 may be normalized, merged and/or corroborated, and their confidence score may be adjusted accordingly (for example, by the janitor 310, or by another janitor). According to one embodiment of the present invention, only facts 306 having a confidence score above a threshold are used for identification of contextual patterns by the janitor 310. Corroborating facts beneficially improves the consistency of extracted facts, and can reduce the influence of improperly applied predefined patterns on the quality of the fact database.

The facts 306 and facts 312 may be associated with a common object. For example, the facts 306 may be extracted from the document 302 and stored as an object in an object repository. According to one embodiment of the present invention, the facts 306 may be associated with an object name. An exemplary method for associating an object name with an object is described in "Identifying a Unifying Subject of a Set of Facts". According to one embodiment of the present invention, the object name (or another property associated with the facts 302) are used to retrieve the document 308. Using the object name to retrieve the document 308 is one example of a method for finding a document potentially containing attribute-value pairs common with the document 302. As another example, the corroboration janitor 306 could query a search engine for documents containing one of the attribute-value pairs of the facts 306. Other methods will be apparent to one of skill in the art without departing from the scope of the present invention.

According to one embodiment of the present invention, the facts 312 are further processed by a janitor (either the janitor 310 or another janitor). For example, the facts 312 can be merged with another set of facts (for example, the facts 306), normalized, corroborated, and/or given a confidence score. According to one embodiment of the present invention, facts 312 having a confidence score above a threshold are added to a fact repository.

Figure 3B:
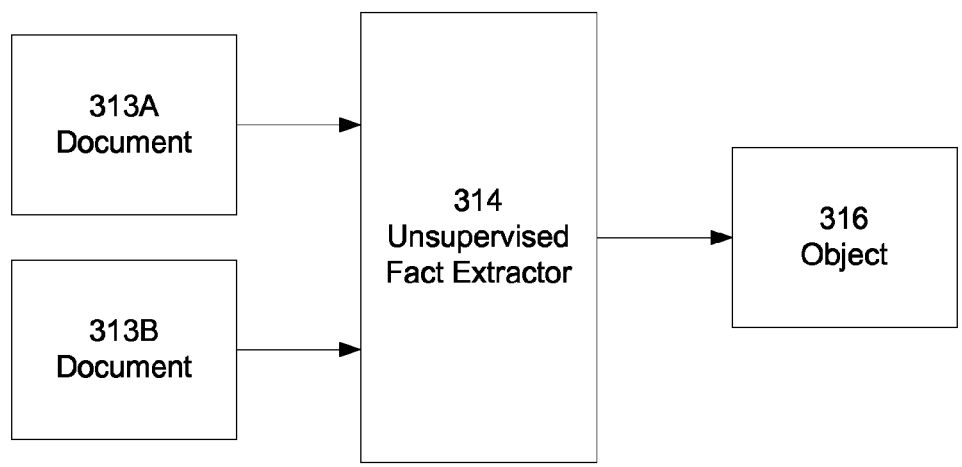

FIG. 3(b) is a block diagram illustrating the extraction of facts from a plurality of documents to produce an object, according to one embodiment of the present invention. The documents 313 contain at least one attribute-value pair in common, although this attribute-value pair may be organized according to different patterns in the various documents. Document 313A and document 313B may or may not describe a common subject.

The unsupervised fact extractor 314 identifies in document 313A a predefined pattern and applies that pattern to extract a "seed" attribute-value pair. The unsupervised fact extractor 314 uses the seed attribute-value pair to identify a contextual pattern, in either or both of the documents 313, and applies the contextual pattern to extract additional attribute-value pairs. A method used by the unsupervised fact extractor 314, according to one embodiment of the present invention, is described herein with reference to FIG. 6. The unsupervised fact extractor 314 may be composed of any number of sub-components, for example, the importer 304 and janitor 310 described herein with reference to FIG. 3(*a*).

The unsupervised fact extractor 314 organizes the extracted attribute-value pairs into an object 316. The unsupervised fact extractor 314 may also employ techniques for normalization, corroboration, confidence rating, and others such as those described in the applications incorporated by reference above. Other methods for processing the extracted facts to produce an object will be apparent to one of skill in the art without departing from the scope of the present invention. Furthermore, the unsupervised fact extractor 314 has been shown as receiving two documents and producing one object for the purposes of illustration only. In practice, the unsupervised fact extractor 314 may operate on any number of documents, to extract a plurality of facts to be organized into any number of objects.

By identifying both predefined and contextual patterns in the documents 313, the unsupervised fact extractor 314 is able to build objects containing more information than extractors relying on predefined patterns alone, and without the need for document-specific human tailoring or intervention.

FIG. 4 is an example of a document containing attribute-value pairs organized according to a predefined pattern. According to one embodiment of the present invention, document 402 may be analogous to the document 302 described herein with reference to FIG. 3. Document 402 includes information about Britney Spears organized according to a two column table 404. According to one embodiment of the present invention, the two column table is a predefined pattern recognizable by the unsupervised fact extractor 314. The pattern specifies that attributes will be in the left column and that corresponding values will be in the right column. Thus the unsupervised fact extractor 314 may extract from the document 402 the following attribute-value pairs using the predefined pattern: (name; Britney Spears), (profession; actress, singer), (date of birth; Dec. 2, 1981), (place of birth; Kentwood, La.), (sign; Sagittarius), (eye color; brown), and (hair color; brown). These attribute-value pairs can then be stored as facts, associated with an object, used as seed attribute-value pairs, and so on.

FIG. 5 is an example of a document 502 from which a contextual pattern can be identified using a seed fact, according to one embodiment of the present invention. Document 502 may be analogous to the document 308 described herein with reference to FIG. 3. Document 502 includes information about Britney Spears. Document 502 illustrates a list 504 organized according to a pattern that for the purposes of illustration could be considered whimsical. Attributes are in bold, and values associated with those attributes are listed immediately below in italics. Such a pattern might be intuitive to a human user, but if that particular pattern is not recognizable to an extractor as a predefined pattern, using predefined patterns exclusively could result in the incorrect or failed extraction of the attribute-value pairs.

However, the document 502 has several attribute-value pairs in common with the document 402. Specifically, the (name; Britney Spears) and (date of birth; Dec. 2, 1981) pairs are contained in both documents. The unsupervised fact extractor 314 can use one (or both) of these pairs as a seed attribute-value pair to identify a contextual pattern of other attribute-value pairs. For example, the (name; Britney Spears) pair might be contained in a context such as the following: <BR><B>Name</B><BR><I>Britney Spears</I>

Thus, using the information extracted from the document 402, the unsupervised fact extractor 314 might identify in document 502 a contextual pattern for attribute-value pairs organized as: <BR><B>(attribute)</B><BR><I>(value)</I>

The common pair comprised of (date of birth; Dec. 2, 1981) may be used to confirm this contextual pattern, since this pair might also be contained in a context such as: <BR><B>Date of Birth</B><BR><I>Dec. 2, 1981</I>

Once the unsupervised fact extractor 314 has identified a contextual pattern, the unsupervised fact extractor 314 uses the contextual pattern to extract additional facts from the document 502. Thus the unsupervised fact extractor 314 may extract from the document 502 the following attribute-value pairs using the predefined pattern: (Favorite Food; Chicken Parmesan), (Favorite Movie; Back to the Future), and (Profession; Singer-Songwriter).

For the purposes of illustration, the document 502 shows attribute-value pairs organized according to a single contextual pattern. Documents may contain multiple and various contextual patterns, or a mix of predefined patterns and contextual patterns. Furthermore, the examples of predefined patterns and contextual patterns illustrated herein as been selected for the purposes of illustration only. In some cases the attribute-value pattern used by document 502 may be recognizable as a predefined pattern, and conversely, in some cases the attribute-value pattern used by document 402 may not be recognizable as a predefined pattern. Given the scope and diversity of the internet, however, there will always be some documents containing attribute-value pairs not organized by a recognizable predefined pattern, and the ability to identify contextual patterns beneficially facilitates the extraction of at least some of these pairs.

Figure 6:
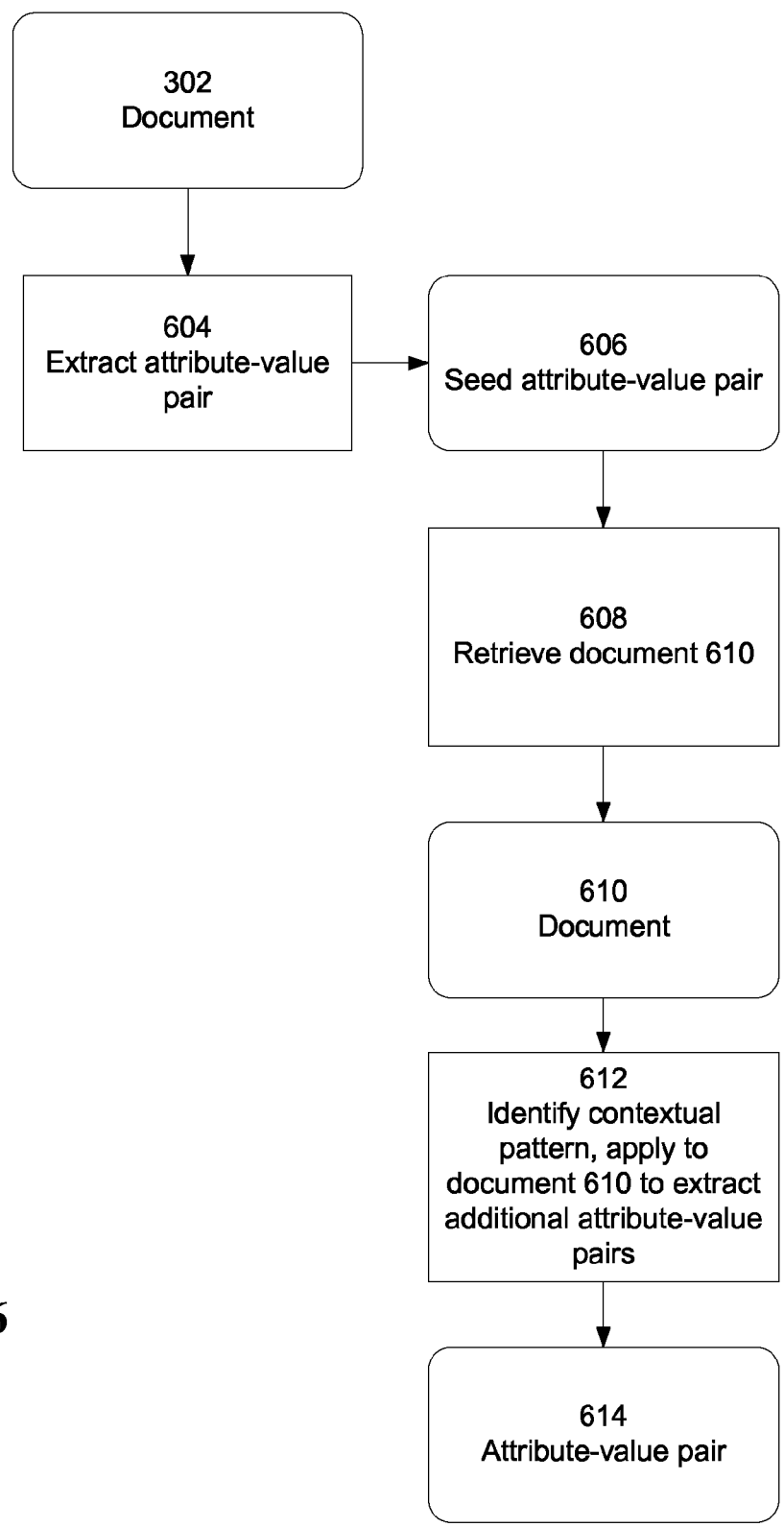
FIG. 6 is a flow chart illustrating a method for extracting facts, according to one embodiment of the present invention.

FIG. 6 is a flow chart illustrating a method for extracting facts, according to one embodiment of the present invention. According to one embodiment of the present invention, the method is performed by the unsupervised fact extractor 314.

The method begins with a document 302. The document 302 contains an attribute-value pair organized according to a predefined pattern. The unsupervised fact extractor 314 extracts 604 an attribute-value pair from the document 302, producing a seed attribute-value pair 606. According to one embodiment of the present invention, the unsupervised fact extractor 314 can extract 604 the attribute and value from the document by applying a predefined pattern; other methods for extracting 604 the attribute and value will be apparent to one of skill in the art without departing from the scope of the present invention. Additionally, the unsupervised fact extractor 314 may store the seed attribute-value pair 606 in a fact (not shown). According to one embodiment of the present invention, the fact in which the seed attribute-pair 606 is stored is associated with an object.

The unsupervised fact extractor 314 retrieves 608 a document 610 that contains the seed attribute-value pair 606 organized according to a contextual pattern.

According to one embodiment of the present invention, the unsupervised fact extractor 314 retrieves 608 the document 610 by searching (for example, on document hosts or in a document repository) for documents containing the attribute and value of the seed attribute-value pair. According to another embodiment of the present invention, the seed attribute-value pair is stored as a fact associated with an object. This object may have a name, and the unsupervised fact extractor 314 may retrieve 608 a document 610 by searching in a document repository for documents containing the object name. Other methods for retrieving 608 a document 610 will be apparent to one of skill in the art without departing from the scope of the present invention.

The unsupervised fact extractor 314 identifies 612 a contextual pattern associated with the seed attribute-value pair 606 and uses the pattern to extract an attribute-value pair 614 from the document 610. The attribute-value pair 614 may then be stored as a fact and processed by further janitors, importers, and object retrievers as appropriate. According to one embodiment of the present invention, the fact in which the attribute-value pair 614 is stored is associated with an object. The fact containing attribute-value pair 614 may be associated with the same object as the fact containing seed attribute-value pair 606, or it may be associated with a different object.

By extracting attributes and value using both predefined and contextual patterns, the unsupervised fact extractor 314 is able to collect a larger amount of information into facts than an extractor relying on either approach alone. Advantageously, information may be extracted into facts efficiently, accurately, and without need for human supervision.

Additionally, the unsupervised fact extractor 314 may also use the contextual pattern to extract another attribute-value pair from a third document. According to one embodiment of the present invention, the unsupervised fact extractor 314 determines if the third document is similar to the document 610, for example, by comparing the domain hosting the document 610 to the domain hosting the third document. Using the contextual pattern to extract another attribute-value pair from a third document may be responsive to the determination that the third document is similar to the document 610. Using the contextual pattern to extract another attribute-value pair from a third document advantageously facilitates the extracting of attribute-value pairs organized according to patterns not recognizable as pre-defined patterns, even from documents not containing a seed attribute-value pair.

While a method for extracting facts has been shown for the purposes of illustration as extracting a single seed attribute-value pair 606 and a single attribute-value pair 614, it will be apparent to one of skill in the art that in practice the unsupervised fact extractor 314 may extract 604 a plurality of attribute-value pairs and extract 612 a plurality of attribute-value pairs 614. When a plurality of attribute-value pairs are extracted 604, any number of that plurality may be used as seed attribute-value pairs 606. According to one embodiment of the present invention, extracting 612 additional attribute-value pairs from the document 610 is responsive to the number of seed-attribute-value pairs 606 contained in the document 610. According to another embodiment of the present invention, a first seed attribute-value pair 606 may be used to identify 612 a contextual pattern and a second seed attribute-value pair 606 may be used to verify that contextual pattern, for example, by determining if the second seed attribute-value pair 606 is organized in the document 610 according to the contextual pattern. By using a plurality of seed attribute-value pairs 606, the efficiency and accuracy of the unsupervised fact extractor 314 may be improved.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for extracting facts, the method comprising:
   at a computer system including one or more processors and memory storing one or more programs, the one or more processors executing the one or more programs to perform the operations of:
      identifying a first fact having an attribute and a value obtained from a first document;
      retrieving a second document that contains the attribute and the value of the first fact;
      identifying in the second document a contextual pattern associated with the attribute and value of the first fact;
      extracting a second fact from the second document using the contextual pattern, the second fact having an attribute that is different than the attribute of the first fact and having a value that is different than the value of the first fact; and
      storing the first fact and the second fact in a fact repository of the computer system.

2. The method of claim 1, further comprising:
   extracting a third fact from a third document using the contextual pattern, the third fact having an attribute that is different than the attribute of the first fact or the attribute of the second fact and having a value that is different than the value of the first fact or the value of the second fact.

3. The method of claim 2, wherein the second document is hosted on a first domain, and wherein the third document is hosted on the first domain.

4. The method of claim 1, further comprising:
   associating the first fact with a first object.

5. The method of claim 4, wherein the first object is associated with an object name, and wherein retrieving the second document comprises searching a repository of documents for a document containing the object name.

6. The method of claim 4, further comprising associating the second fact with the first object.

7. The method of claim 1, further comprising:
   identifying a first plurality of facts from the first document, each fact having an attribute and a value.

8. The method of claim 7, wherein identifying in the second document a contextual pattern associated with the attribute and value of the first fact comprises:
   identifying in the second document a contextual pattern associated with the attributes and the values of a number of the first plurality of facts.

9. The method of claim 8, wherein said extracting said second fact is responsive to the number of the first plurality of facts having attributes and values associated with the contextual pattern.

10. The method of claim 7, wherein said first plurality of facts includes a third fact, the method further comprising:
    determining if the third fact is organized in the second document according to the contextual pattern.

11. The method of claim 1, wherein said first document is different from said second document.

12. The method of claim 1, wherein retrieving the second document comprises querying a search engine for a document containing the attribute and the value of the first fact.

13. A system for extracting facts comprising:
    one or more processors; and
    memory storing one or more programs to be executed by the one or more processors;
    the one or more programs comprising instructions for:
       identifying a first fact having an attribute and a value obtained from a first document;
       retrieving a second document that contains the attribute and the value of the first fact;
       identifying in the second document a contextual pattern associated with the attribute and value of the first fact;
       extracting a second fact from the second document using the contextual pattern, the second fact having an attribute that is different than the attribute of the first fact and having a value that is different than the value of the first fact, and
       storing the first fact and the second fact in a fact repository.

14. The system of claim 13, further comprising:
    instructions for extracting a third fact from a third document using the contextual pattern.

15. The system of claim 13, further comprising:
    instructions for associating the first fact with a first object.

16. The system of claim 15, wherein the first object is associated with an object name, and wherein the instructions for retrieving the second document comprise instructions for searching a repository of documents for a document containing the object name.

17. A non-transitory computer readable storage medium storing one or more programs configured for execution by a computer, the one or more programs comprising instructions for:
    identifying a first fact having an attribute and a value obtained from a first document;
    retrieving a second document that contains the attribute and the value of the first fact;
    identifying in the second document a contextual pattern associated with the attribute and value of the first fact;
    extracting a second fact from the second document using the contextual pattern, the second fact having an attribute that is different than the attribute of the first fact and having a value that is different than the value of the first fact; and
    storing the first fact and the second fact in a fact repository.

18. The non-transitory computer readable storage medium of claim 17, the computer-readable medium further comprising:
    program code for extracting a third fact from a third document using the contextual pattern.

19. The non-transitory computer readable storage medium of claim 17, the computer-readable medium further comprising:

program code for associating the first fact with a first object.

20. The non-transitory computer readable storage medium of claim 19, wherein the first object is associated with an object name, and wherein the program code for retrieving the second document comprises program code for searching a repository of documents for a document containing the object name.

* * * * *